(12) United States Patent
Bonardi et al.

(10) Patent No.: US 6,696,935 B2
(45) Date of Patent: Feb. 24, 2004

(54) TIRE MONITORING SYSTEM

(75) Inventors: Timothy A. Bonardi, Buchanan, MI (US); David J. Schmidt, Holland, MI (US); Robert R. Turnbull, Holland, MI (US); Robert C. Knapp, Coloma, MI (US); Gregg A. Chandler, Saint Joseph, MI (US)

(73) Assignee: Gentex Corporation, Zeeland, MI (US)

( * ) Notice: Subject to any disclaimer, the term of this patent is extended or adjusted under 35 U.S.C. 154(b) by 120 days.

(21) Appl. No.: 09/949,955

(22) Filed: Sep. 10, 2001

(65) Prior Publication Data

US 2003/0048178 A1 Mar. 13, 2003

(51) Int. Cl.[7] ............................................... B60C 23/00
(52) U.S. Cl. ...................................... 340/447; 340/635
(58) Field of Search ................................ 340/447, 438, 340/635, 825.69, 825.72; 307/10.1, 10.2

(56) References Cited

U.S. PATENT DOCUMENTS

| | | | |
|---|---|---|---|
| 4,210,357 A | 7/1980 | Adachi | |
| 4,510,484 A | 4/1985 | Snyder | |
| 4,672,375 A | 6/1987 | Mochida et al. | |
| 4,734,674 A | 3/1988 | Thomas et al. | |
| 4,761,645 A | 8/1988 | Mochida | |
| 4,868,915 A | 9/1989 | Anderson, III et al. | |
| 4,873,530 A | 10/1989 | Takeuchi et al. | |
| 4,966,034 A | 10/1990 | Bock et al. | |
| 4,970,491 A | 11/1990 | Saint et al. | |
| 4,978,941 A | 12/1990 | Brown | |
| 5,001,457 A | 3/1991 | Wang | |
| 5,061,917 A | 10/1991 | Higgs et al. | |
| 5,463,374 A | 10/1995 | Mendez et al. | |
| 5,504,478 A | 4/1996 | Knapp | |
| 5,512,901 A | 4/1996 | Chen et al. | |
| 5,581,023 A | 12/1996 | Handfield et al. | |
| 5,600,301 A | 2/1997 | Robinson, III | |
| 5,612,671 A | 3/1997 | Mendez et al. | |
| 5,774,048 A | 6/1998 | Achterholt | |
| 6,002,327 A | 12/1999 | Boesch et al. | |
| 6,043,738 A | 3/2000 | Stewart et al. | |
| 6,215,389 B1 | 4/2001 | Schmidt | |
| 6,259,361 B1 | 7/2001 | Robillard et al. | |

*Primary Examiner*—John Tweel
(74) *Attorney, Agent, or Firm*—Price, Heneveld, Cooper, DeWitt & Litton

(57) ABSTRACT

A tire monitoring (TM) system includes a peak detector signal filter that is configured to substantially prevent impulse noise from increasing a data slicer threshold, while simultaneously allowing the data slicer threshold to follow the variations in a received message attributable to signal fading. The TM system also automatically determines the location of a plurality of vehicle tires relative to the vehicle, utilizes a single receiver to receive messages of multiple lengths and masks an alarm when a missing ID code corresponds to a stored ID code associated with a flat tire.

23 Claims, 11 Drawing Sheets

TIRE MONITORING SYSTEM

BACKGROUND OF THE INVENTION

The present invention is generally directed to a tire monitoring system, and more particularly, to an automotive tire monitoring system.

Historically, automotive tire pressure monitoring (TPM) systems were time-based. That is, a transmitter/sensor located within each tire periodically determined the tire pressure of an associated tire and transmitted the tire pressure along with a unique identification (ID) code, identifying the transmitter, to a receiver located within the vehicle. Typically, a processor, coupled to the receiver, executed a program to determine whether a given transmitter had transmitted within a given time period. When the receiver failed to receive a transmission from the given transmitter during the given time period or periods, the processor typically executed a routine, which removed the ID code associated with the missing transmitter from a main storage array in a memory. In at least one TPM system, an auxiliary storage array was utilized to provide new ID codes to replace those that were associated with the missing transmitter.

An event-based TPM system has executed software such that the system determined, after a number of recognized ID codes were received, whether the transmitter associated with each vehicle tire was still active. The event-based TPM system then attempted to replace ID codes associated with transmitters that failed to transmit for a particular number of events. Event-based TPM systems are normally preferable to time-based TPM systems in that an event-based TPM system can function with a group of transmitters that have different transmission rates from, for example, one group to another group. In a typical event-based TPM system, a processor, connected to an output device, has initiated an audible or visual indication, on the output device, when one of the tires of the vehicle, for example, exhibited a pressure below a low pressure threshold. However, both time-based and event-based TPM systems have required operator inspection or intervention (i.e., training of the systems) to determine the particular location (i.e., front-driver, front-passenger, rear-driver or rear-passenger) of the tire or tires on the vehicle.

Event-based TPM systems, like time-based TPM systems have included a unique ID code for each individual tire transmitter/sensor. Further, each tire transmitter has provided a certain number of data bits (e.g., eight bits representing tire pressure) in each frame (i.e., message). Due to lack of standardization and for functionality reasons, some manufacturers have implemented tire transmitters that have different length ID codes and, in general, different length frames. In addition, while some vehicle manufacturers have included a transmitter/sensor within a spare tire, other vehicle manufacturers have not incorporated a transmitter/sensor within the spare tire.

In some TPM systems, the receiver of the system has been coupled to a data slicer, which has functioned to identify each individual bit of a frame. In the automotive environment, a transmitted message associated with a tire transmitter normally exhibits signal fading due to wheel rotation and may be subject to impulse noise (e.g., high frequency noise attributable to microprocessor switching), which can adversely affect the functioning of the data slicer. As such, some data slicers have used an averaging signal filter to prevent the impulse noise from adversely affecting the data slicer threshold. However, implementing an averaging signal filter in TPM systems that utilize a pulse width modulation (PWM) coding scheme (e.g., thirty-three percent 'on' for a logic zero, and sixty-six percent 'on' for a logic one) is not always desirable. This is because PWM codes have a variable direct current (DC) component, which results in a data slicer threshold that varies depending on the data transmitted. That is, utilizing an averaging signal filter in conjunction with a data slicer typically yields a data slicer threshold that is lower than desired when high levels of impulse noise are present. Further, the averaging signal filter tends to limit the ability of the data slicer threshold to follow variations in the demodulated signal that are attributable to signal fading due to wheel rotation.

Thus, what is needed is a tire monitoring (TM) system that processes data frames of different lengths. Further, it would be desirable for the TM system to function with spare tires that include transmitters as well as spare tires without transmitters. Additionally, it would be desirable for a data slicer associated with the receiver of the TM system to properly function in the presence of impulse noise. Further, it would be desirable for the TM system to automatically associate a received ID code with a particular tire location.

SUMMARY OF THE INVENTION

An embodiment of the present invention is directed toward improving the ability of a data slicer, that is coupled to a tire monitoring (TM) system receiver, to properly resolve data bits of a received message in the presence of high noise levels relative to the received message, which also exhibits signal fading. In this embodiment, a peak detector that includes a peak detector input and a peak detector output provides a peak detector signal that corresponds to a peak of a received demodulated signal. The peak detector input is coupled to a first input of the data slicer. A peak detector signal filter is coupled between the peak detector output and a second input of the data slicer and is configured to substantially prevent impulse noise from increasing a variable data slicer threshold on the second input of the data slicer, while simultaneously allowing the data slicer threshold to follow the variations in the demodulated signal attributable to signal fading.

Another embodiment of the present invention is directed toward automatically determining the location of a plurality of vehicle tires relative to a vehicle. A sensor, located in each of the tires, provides an indicator of a rotation direction in a main rotation plane. A transmitter, located within each of the tires, is configured to transmit a unique transmitter identification code and the indicator of the rotation direction in the main rotation plane and another indicator of whether one of the tires has turned out of the main rotation plane to a receiver located in the vehicle.

Yet another embodiment of the present invention is directed to utilizing a single receiver to receive messages of multiple lengths. Initially, a message that includes a plurality of bits, a portion of which correspond to a transmitter identification (ID) code, is received. When a bit is not detected in the received message for a timeout period, a timeout indication is provided. A first indication is provided when the number of bits in the received message is equal to a first number of total bits. A second indication is provided when the number of bits in the received message is equal to a second number of total bits, which is greater than the first number of total bits. The message is then processed according to the first and second indications, which allows different length messages to be distinguished such that the single receiver can receive transmissions from transmitters that have different length messages.

In still another embodiment of the present invention, an alarm, provided by the tire monitoring system, is masked when a transmitter equipped flat tire is replaced with a spare tire that does not include a transmitter. Initially, a transmitter identification code associated with the flat tire is stored. Next, it is determined whether a missing transmitter identification code corresponds to the stored transmitter identification code associated with the flat tire. If so, the alarm is masked.

These and other features, advantages and objects of the present invention will be further understood and appreciated by those skilled in the art by reference to the following specification, claims, and appended drawings.

DETAILED DESCRIPTION OF PREFERRED EMBODIMENT(S)

Figure 1A:
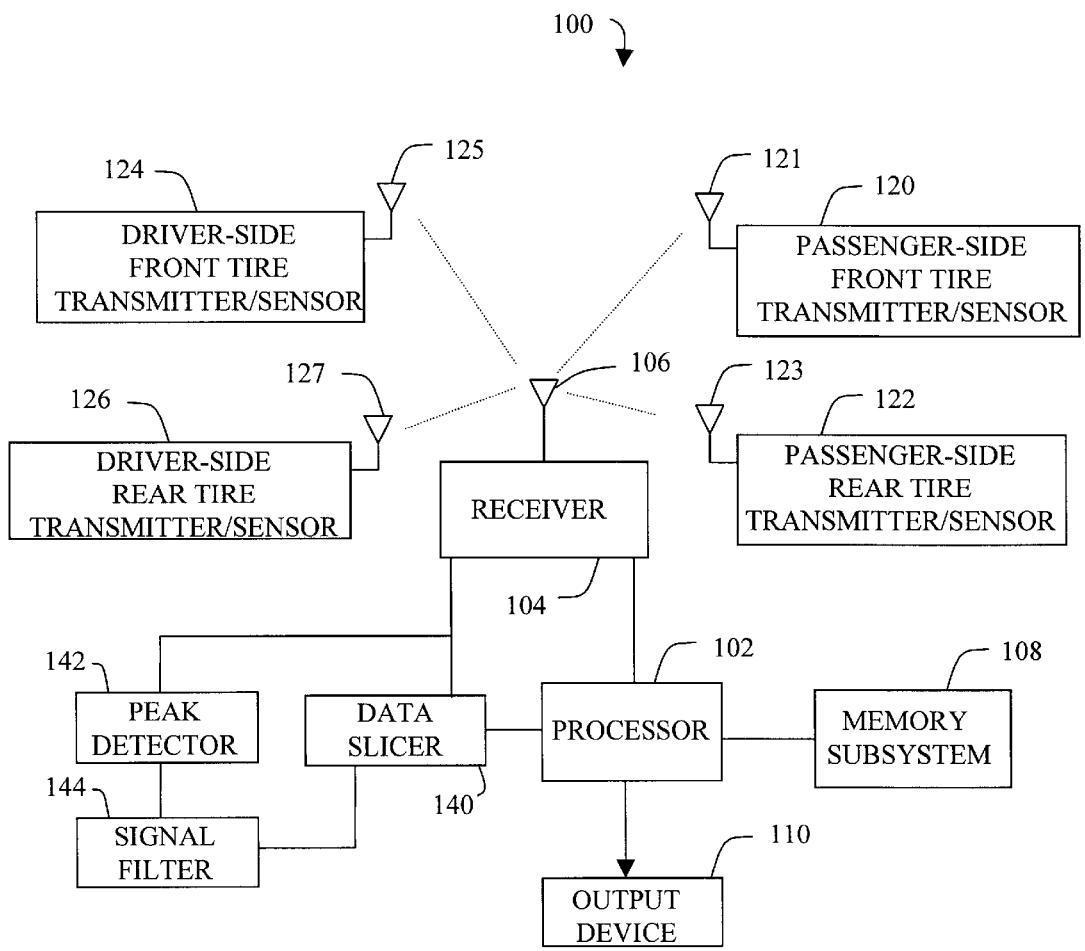
FIG. 1A is an electrical schematic, in block diagram form, of a tire monitoring (TM) system, according to an embodiment of the present invention.

Turning to FIG. 1A, an exemplary tire monitoring (TM) system 100, incorporating various embodiments of the present invention, is shown. The TM system 100 includes a processor 102 that executes various routines, stored within a memory subsystem 108, to process messages received through an antenna 106 of a receiver 104. The memory subsystem 108 includes an application appropriate amount of volatile memory (e.g., static random access memory (SRAM)) and non-volatile memory (e.g., electrically erasable programmable read-only memory (EEPROM)) for storing information and executable code for implementing various embodiments of the present invention. When a low pressure tire (e.g., a flat tire) is detected, processor 102 causes an audible and/or visual indication to be provided via an output device 110. When the output device 110 includes a display, the display can be located within a mirror or in another location within the vehicle. Preferably, the display provides an identification (ID) code, tire location and tire pressure to a driver of the vehicle.

A transmitter/sensor 120, 122, 124 and 126, located within each vehicle tire, periodically transmits a message to the receiver 104 through an antenna 121, 123, 125 and 127, respectively. A sensor located within each transmitter/sensor 120, 122, 124 and 126 can be of a wide variety of sensors or a combination of sensors. In one embodiment, each sensor includes a temperature sensor, which can be utilized to determine if a tire has overheated and can also generally be utilized to distinguish a front tire of a front-wheel drive vehicle in that the front tires of a front-wheel drive vehicle are typically warmer than the rear tires of a front-wheel drive vehicle.

Figure 1B:
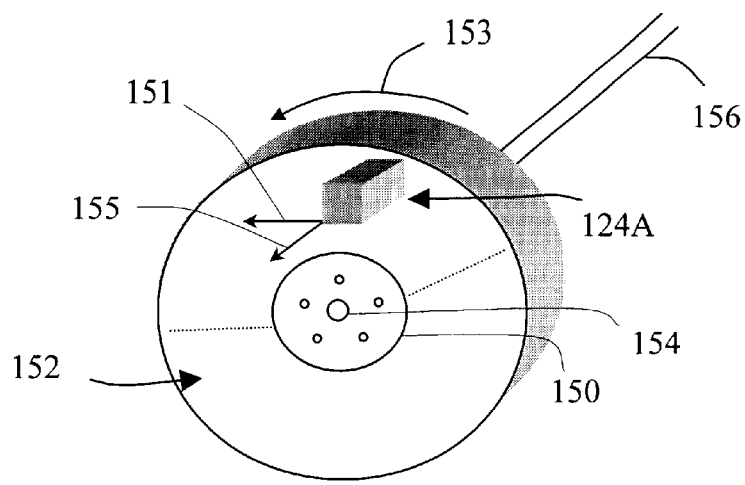
FIG. 1B is a diagram illustrating the location of a sensor in a vehicle tire and its relationship to a vehicle axle.

Each sensor preferably provides data that allows the processor 102 to distinguish the direction of rotation of each tire (mounted to a wheel) on a vehicle. In this embodiment, a bit is preferably utilized in a transmitted message to indicate the direction of rotation of a given tire. As shown in FIG. 1B, a sensor 124A, such as a two axis accelerometer or gyroscope, is placed in each tire 152 such that a first axis 151 of the sensor 124A is aligned in a tire rotation plane that is perpendicular to a fixed axle 156 of the vehicle (i.e., a rear axle in a conventional vehicle), which is attached to the wheel 150, approximate the center 154 of the wheel 150. The tire rotation plane is defined by the plane of tire rotation 153 (i.e., a main rotation plane) and a second axis 155 of the sensor 124A is aligned perpendicular to the plane of tire rotation 153 (i.e., the main rotation plane). As such, a tire rotating on one side of the vehicle produces a positive force, while a tire on the opposite side of the vehicle produces a negative force. Transmitting this information allows processor 102 to determine the side (passenger or driver) of the vehicle for each transmitter.

The second axis 155 of the accelerometer (i.e., the axis that is parallel to the axle 156) can be utilized to measure the force created when the front wheels turn out of the main rotation plane. The force created when the front wheels turn left or right allows the TM system 100 to determine which tires are located on the front of the vehicle. In this embodiment, another bit is utilized in a transmitted message to indicate whether a given tire is a front or a rear tire. It is also contemplated that a gyroscope located within each tire can be used to measure the direction of rotation and the turning of the front tires.

Figure 1C:
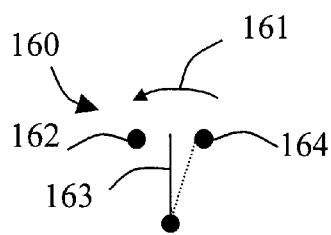
FIGS. 1C–D are electrical schematics of a double throw switch.
Figure 1D:
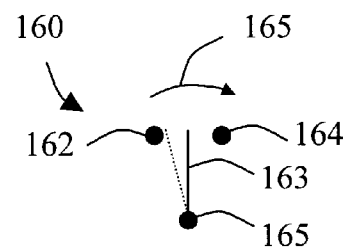
Figure 1E:
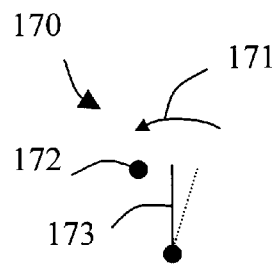
FIGS. 1E–1F are electrical schematics of a single throw switch.
Figure 1F:
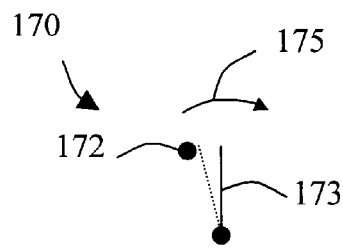

Alternatively, two single axis accelerometers can be implemented. In this implementation, one single axis accelerometer is placed perpendicular to the main rotation direction 153 and the other single axis accelerometer is placed along the main rotation direction 153. As shown in FIGS. 1C–1D, another embodiment includes a double throw switch 160, placed along the main rotation plane, to determine which side of the vehicle a given tire is located on. The direction of rotation 161 and 165 can then be determined in that one of the two contacts 162 and 164 will make contact with wiper 163 when the vehicle is in motion, due to the force of rotation. A controller (not shown separately) located within each transmitter/sensor 120, 122, 124 and 126 detects contact closure and provides the direction of rotation (e.g., by setting or clearing a direction bit) in a message to the receiver of the TM system 100 for interpretation. In yet another embodiment, as shown in FIGS. 1E–1F, a single throw switch 170 is utilized to determine direction. In this embodiment, a switch closure represents one rotation direction 175 and no switch closure represents the other rotation direction 171. That is, when a tire is rotating in direction 175, wiper 173 will make contact with contact 172.

According to yet another embodiment of the present invention, two piezo electric devices located in each tire can be utilized. In this embodiment, the rotation force of the tire causes each of the piezo electric devices to generate a sinusoidal electric signal. The phase difference between the two piezo electric devices can be measured to determine which direction a given tire is rotating. It is also contemplated that the piezo electric device can be utilized to generate power for the transmitter/sensor and/or potentially charge a battery associated with the transmitter/sensor. In still another embodiment of the present invention, an IR (infrared) image sensor can be placed inside each tire to monitor the collapse of the inside surface of the tire. As the tire rotates, the rubber tread collapses in the opposite direction allowing the direction of tire rotation to be determined. In summary, the TM system 100 incorporating sensors, as described above, can advantageously automatically ascertain the location of each tire without the intervention of a vehicle owner or service technician.

In the TM system of FIG. 1A, the receiver 104 is also coupled to a data slicer (i.e., a comparator) 140 and a peak detector (i.e., a diode) 142. The data slicer 140 is also coupled to the processor 102 and a signal filter 144. As is further described below, in conjunction with FIG. 10C, the data slicer 140 receives a received demodulated signal on a first input and a filtered peak detector signal sets a variable data slicer threshold on a second input. An output of the data slicer 140 is provided to the processor 102, for processing.

In TM systems in which it is not desirable to implement automatic determination of the location of a tire on a vehicle, it is contemplated that ID codes can be recorded on the valve stem of each tire. In this manner, when a given TM system detects a low pressure tire, the ID code is displayed. By examining the tire stems, the driver or service technician can ascertain which tire is low. As a percentage of the population suffers from color blindness, marking a valve stem with an ID code and visually providing ID codes for low pressure tires is generally preferable to color coding techniques. In addition to processing received messages to determine the location of a given tire relative to a vehicle, processor 102 also processes received messages to determine the frame length of a given message.

Figure 2:
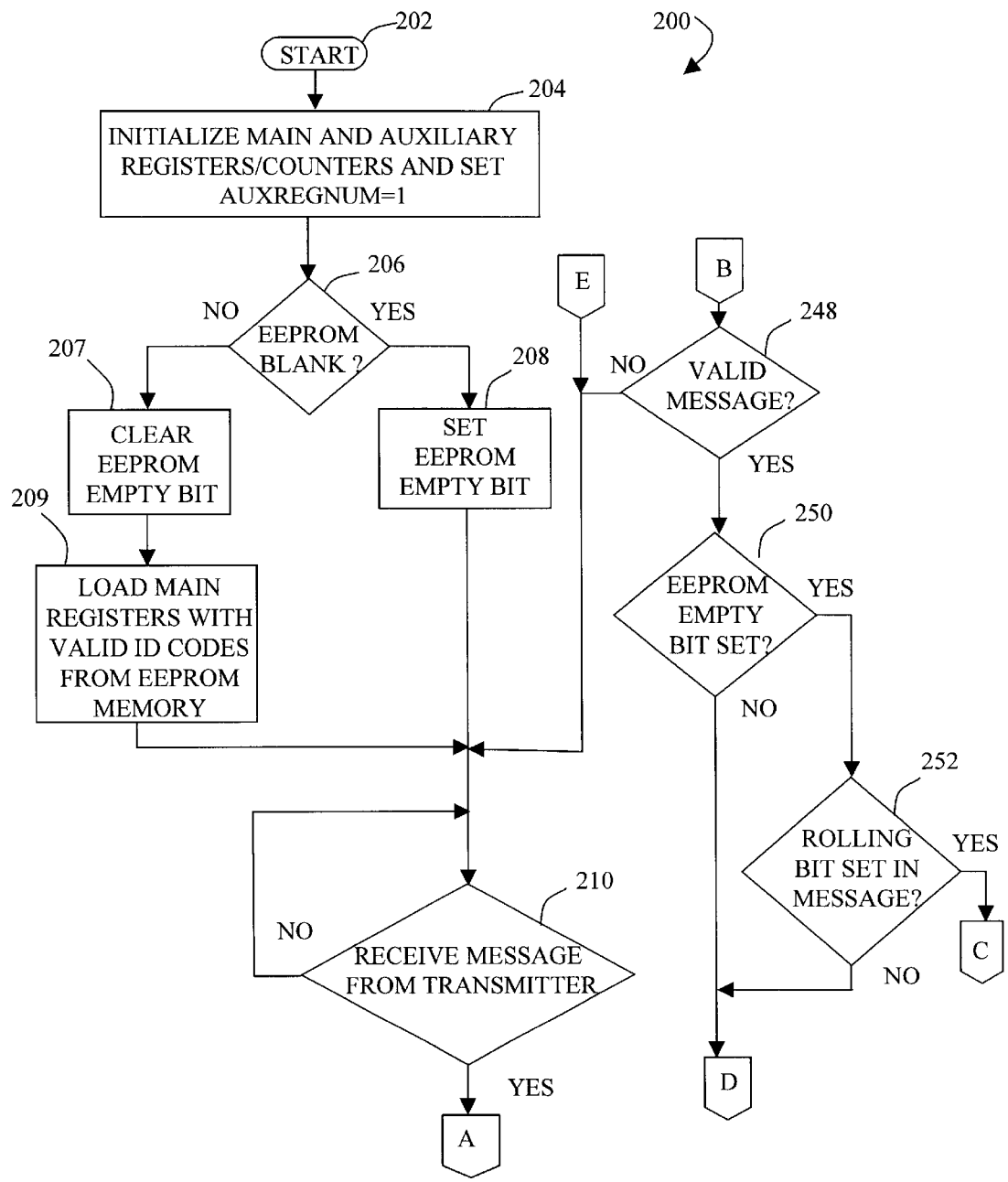
FIGS. 2–9 are a flowchart of a TM routine that implements a number of processes, according to embodiments of the present invention.

FIGS. 2–9 depict a flowchart of a tire monitoring (TM) routine 200, which implements various embodiments of the present invention. The routine 200 is executed by the processor 102, while the system 100 is active, e.g., when a vehicle, in which system 100 is located, is running. Turning to FIG. 2, the routine 200 is initiated in step 202. Next, in step 204, main and auxiliary registers and ID code counters are initialized and the variable 'AUXREGNUM', which is utilized to track which auxiliary register is available (if any), is set equal to one. In a preferred embodiment, four main registers and eight auxiliary registers are utilized. Each of the main and auxiliary registers have an associated ID code counter. A main ID code counter is utilized to track the number of times an ID code that is received corresponds to an ID code to be stored or already stored within one of the main registers. An auxiliary ID code counter is utilized to track the number of times a received ID code corresponds to an ID code to be stored or already stored within one of the auxiliary registers. On vehicles that may pull trailers, it is contemplated that the system described herein can also include trailer registers and associated trailer ID code counters. It is contemplated that such a system would be particularly useful when implemented with semi-tractors and vehicles commonly used to pull recreational vehicles.

A TM system that utilizes four main registers and four auxiliary registers is disclosed in commonly assigned U.S. Pat. No. 6,215,389 to Schmidt, entitled "TIME INDEPENDENT EVENT-BASED SYSTEM FOR RECEIVING AND DISCRIMINATING UNIQUE CODES FOR MULTIPLE TRANSMITTERS AND METHODS FOR DOING THE SAME," and is hereby incorporated herein by reference. Increasing the quantity of auxiliary registers allows the capturing of more transmitters in the situation where there are more than four transmitters in the reception area. It is contemplated that the present invention may include a user selectable switch (e.g., a button), which allows more than four ID codes to be accepted and stored within the system 100. For example, a fifth ID code may correspond to a spare tire.

As illustrated in FIG. 2, when the engine of the vehicle is started after being inactive, processor 102 determines whether the EEPROM located within memory subsystem 108 is blank and/or includes invalid data in decision step 206. If the EEPROM is blank and/or includes invalid data, control transfers to step 208 where processor 102 sets an 'EEPROM EMPTY BIT'. The 'EEPROM EMPTY BIT' is used to indicate that the EEPROM does not contain valid ID codes that are available for loading into the main registers (i.e., static random access memory (SRAM)) allocated within non-volatile memory. Next, in decision step 210, processor 102 determines if a message has been received. As previously discussed, a message may be received from one of the transmitters located within a tire of the vehicle or may come from a transmitter associated with another vehicle. When a message is received, in step 210, control transfers to step 212 (FIG. 3).

Figure 3:
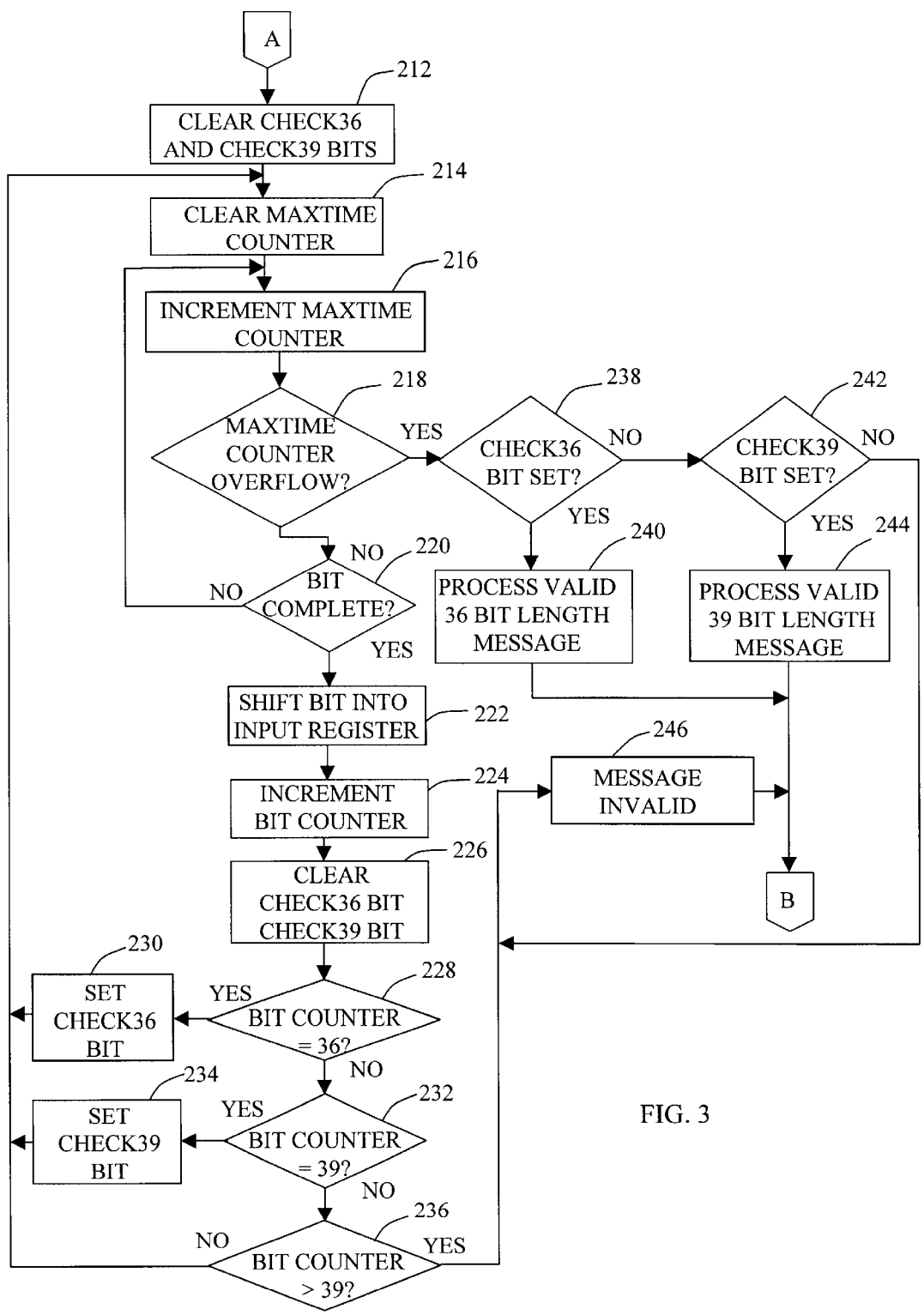

Turning to FIG. 3, a validation process is disclosed which allows a single receiver to receive messages of multiple lengths. As depicted in step 212, processor 102 clears a 'CHECK36' bit and a 'CHECK39' bit. The 'CHECK36' bit, when asserted, indicates that the message includes thirty-six bits and the 'CHECK39' bit, when asserted, indicates that the message includes thirty-nine bits. Next, in step 214, processor 102 clears a 'MAXTIME COUNTER', which is utilized to determine when a received message has concluded. Next, in step 216, processor 102 increments the 'MAXTIME COUNTER'. Then, in decision step 218, processor 102 determines whether the 'MAXTIME COUNTER' has overflowed. If the 'MAXTIME COUNTER' has overflowed, control transfers from step 218 to decision step 238.

Otherwise, control transfers to decision step 220. In step 220, processor 102 determines whether the most recently received bit is complete. If so, control transfers from 20 step 220 to step 222. If not, control transfers from step 220 to step 216. In step 222, processor 102 causes a completed bit to be shifted into an input register. Next, in step 224, processor 102 causes a message bit counter to be incremented. Then, in step 226, processor 102 clears the 'CHECK36' bit and the 'CHECK39' bit. Next, in decision step 228, processor 102 determines whether the bit counter is equal to thirty-six. If so, control transfers from step 228 to step 230, where processor 102 sets the 'CHECK36' bit. If not, control transfers from step 228 to decision step 232 where processor 102 determines whether the message bit counter is equal to thirty-nine. If so, control transfers to step 234 where processor 102 causes the 'CHECK39' bit to be set. If not, control transfers to decision step 236 where processor 102 determines whether the message bit counter is greater than thirty-nine. If the message bit counter is greater than thirty-nine an invalid message is indicated and control transfers to step 246. If the message bit counter is still less than thirty-nine, control transfers from step 236 to step 214.

As discussed above, when the 'MAXTIME COUNTER' has overflowed in step 218, control transfers to step 238, where processor 102 determines whether the 'CHECK36' bit is set. If the 'CHECK36' bit is set, control transfers from step 238 to step 240, where processor 102 causes a valid thirty-six bit length message to be processed. Otherwise, control transfers from step 238 to decision step 242, where processor 102 determines whether the 'CHECK39' bit is set. If so, control transfers to step 244, where processor 102 processes a valid thirty-nine bit length message at which time control transfers to step 248. From steps 240 and 244, control transfers to step 248 (FIG. 2) where processor 102 determines whether the previously received message was valid. In step 242, when processor 102 determines that the 'CHECK39' bit is not set, control transfers to step 246, to provide an invalid message indication, and then to step 248 (FIG. 2).

In summary, FIG. 3 discloses a process which allows a single receiver to receive messages of multiple lengths. As discussed above, a timeout indication ('MAXTIME COUNTER' overflow) is provided when a bit is not detected for a timeout period. When a thirty-nine bit message is received, the 'CHECK39' bit is set. When a thirty-six bit message is received, the 'CHECK36' bit is set. One of ordinary skill in the art will readily appreciate that messages of lengths, other than thirty-six and thirty-nine bits, can be utilized and that messages (e.g., frames) of more than two lengths can be implemented with slight modifications to the above process.

Figure 4:
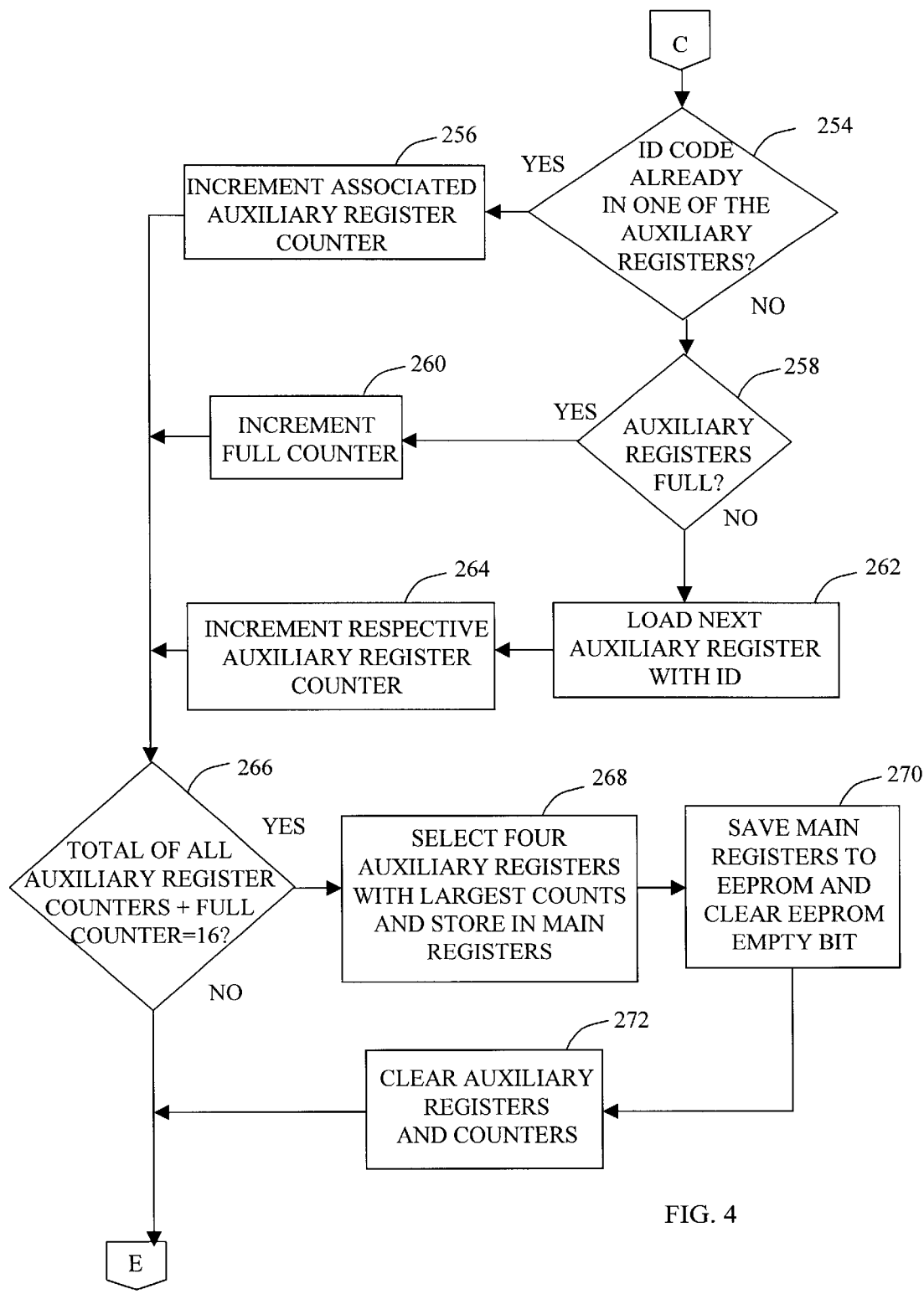

Returning to FIG. 2, when a valid message is not indicated in step 248, control transfers to step 210 where processor 102 waits to receive another message. When a valid message is indicated in step 248, control transfers to step 250. If the 'EEPROM EMPTY BIT' is set, control transfers to decision step 252. In step 252, processor 102 determines whether the 'ROLLING BIT' is set in the message. The 'ROLLING BIT' is utilized such that the portion of the routine 200, illustrated in FIG. 4, is not implemented unless the vehicle is in motion. This is advantageous in that it prevents the TM system 100 receiver from implementing the "fast load" process of FIG. 4, when the vehicle is not moving and thus, potentially prevents the system 100 from storing ID codes associated with other vehicles.

Preferably, the system incorporates one of the sensors, described above, which provides an indication (e.g., a 'ROLLING BIT') of whether the vehicle is in motion. The 'ROLLING BIT' can be utilized both to mask undesired ID codes and to ignore a low pressure tire when the low pressure tire is not rolling (e.g., in the trunk) or to distinguish a spare tire when the spare tire is not located on the vehicle (e.g., in the trunk).

The 'ROLLING BIT' also allows the system 100 to distinguish tires located on the vehicle from tires on another vehicle in, for example, a parking lot. Preferably, the system described herein uses a receiver that works with both remote keyless entry (RKE) transmitters and tire transmitters. Preferably, the receiver continually receives transmitted messages so as to receive RKE signals, but ignores TM messages when the ignition is off. In a preferred embodiment, all audible alarms time-out after a predetermined period (e.g., fifteen minutes). Further, all audible and visual alarms are, preferably, discontinued after the vehicle is motionless for an appropriate time period (e.g., fifteen minutes) and are reset after a particular time period.

The system can, preferably, receive inputs (e.g., speed, odometer, revolutions per minute (RPM) and ignition cycles) from a vehicle bus and adjust sensitivity to fit various travel speed conditions, e.g., reduce logging of ID codes when the vehicle is not in motion. Not logging ID codes when the vehicle ignition is off reduces the possibility of learning other transmitters when the vehicle is parked, for example, in a garage with other vehicles. As is discussed in further detail below, the system 100, preferably, tracks the ID code of a flat tire and stores the ID code within a non-volatile memory such that when the flat tire is replaced with a spare tire that does not include a transmitter, an alarm is not provided. In a preferred embodiment, a spare tire transmitter transmits at a first rate (e.g., once per hour) when it is stored and at a second rate (e.g., once per minute) when it is rolling.

When the 'ROLLING BIT' of a message is set, control transfers from step 252 to decision step 254 (FIG. 4). Turning to FIG. 4, a process is depicted that facilitates a faster loading of the main registers with received ID codes when the EEPROM is blank and the vehicle engine is running. In step 254, processor 102 determines whether the received ID code is already in one of the auxiliary registers. If so, control transfers from step 254 to step 256. In step 256, processor 102 causes the auxiliary register ID code counter associated with the auxiliary register that contains the received ID code to be incremented. From step 256, control transfers to decision step 266. In step 254, when the received ID code is not already stored in one of the auxiliary registers, processor 102 causes control to be transferred to decision step 258 where processor 102 determines whether the auxiliary registers are full. If so, control transfers from step 258 to step 260, where processor 102 causes the full counter to be incremented. From step 260, control transfers to step 266. If the auxiliary registers are not full in step 258, control transfers to step 262 where processor 102 causes the next available auxiliary register to be loaded with the received ID code. Next, in step 264, processor 102 causes the auxiliary register ID code counter associated with the auxiliary register that contains the received ID code to be incremented.

In step 266, processor 102 determines the sum of all the auxiliary register ID code counters and the full counter and determines whether the sum is equal to sixteen. If not, control transfers from step 266 to step 210 (FIG. 2). Otherwise, control transfers from step 266 to step 268. It will be appreciated that a threshold, other than sixteen, can be utilized, if desired. In step 268, the ID codes of the four auxiliary registers with the largest counts are stored in the four main registers. Next, in step 270, processor 102 saves the main registers to the EEPROM and clears the 'EEPROM EMPTY BIT'. Then, in step 272, processor 102 clears the auxiliary registers and counters. From step 272, control returns to step 210 (FIG. 2). In summary, FIG. 4 illustrates a process that facilitates a faster loading of the main registers with received ID codes when the EEPROM is blank and the vehicle engine is running.

Returning to FIG. 2, in step 250, when the 'EEPROM EMPTY BIT' is not set, processor 102 causes control to be transferred to step 274 (FIG. 5), where normal processing is implemented. In step 252 (FIG. 2), when the 'ROLLING BIT' is not set in the message, processor 102 also transfers control to step 274 (FIG. 5).

Figure 5:
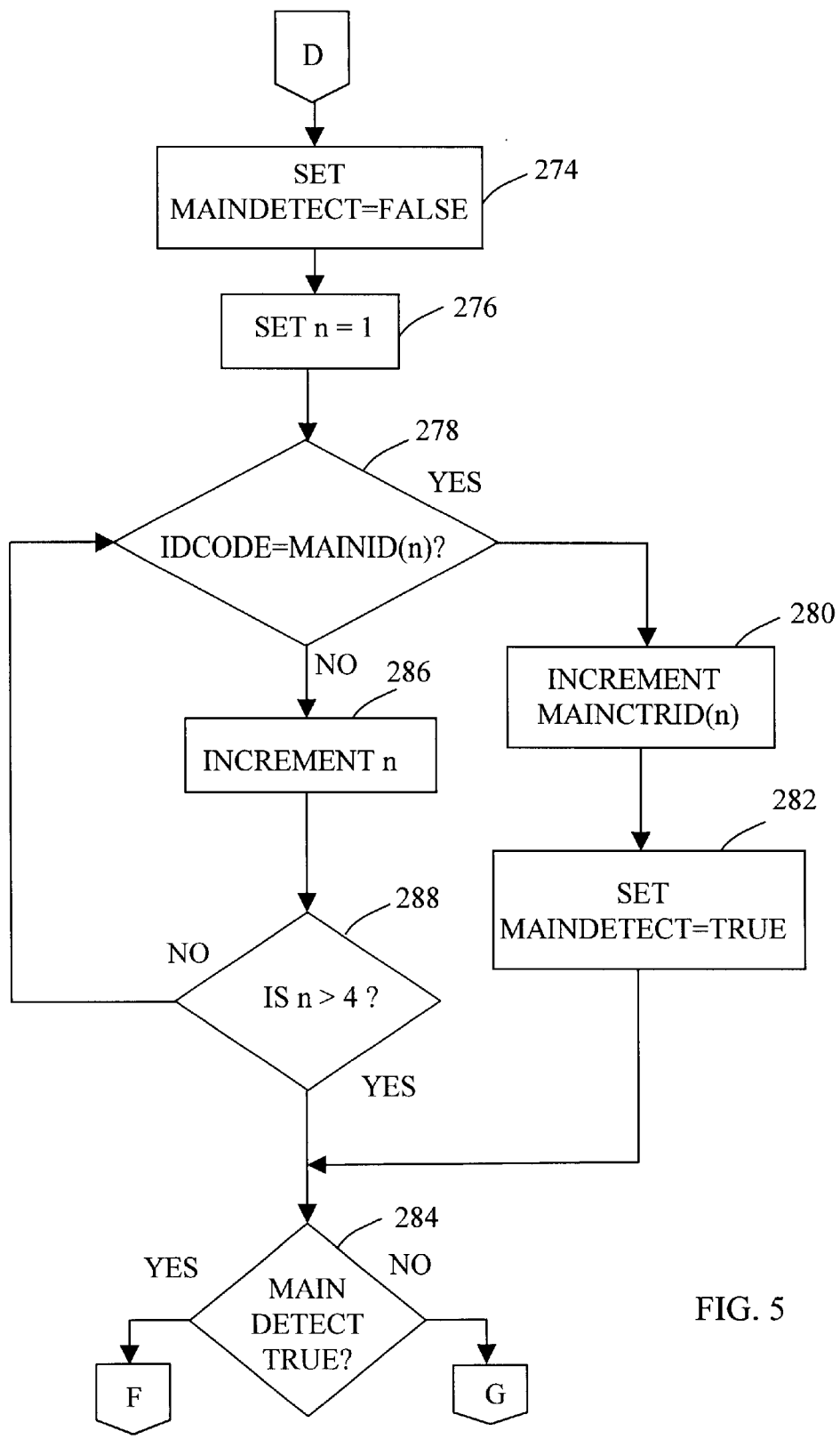
Figure 6:
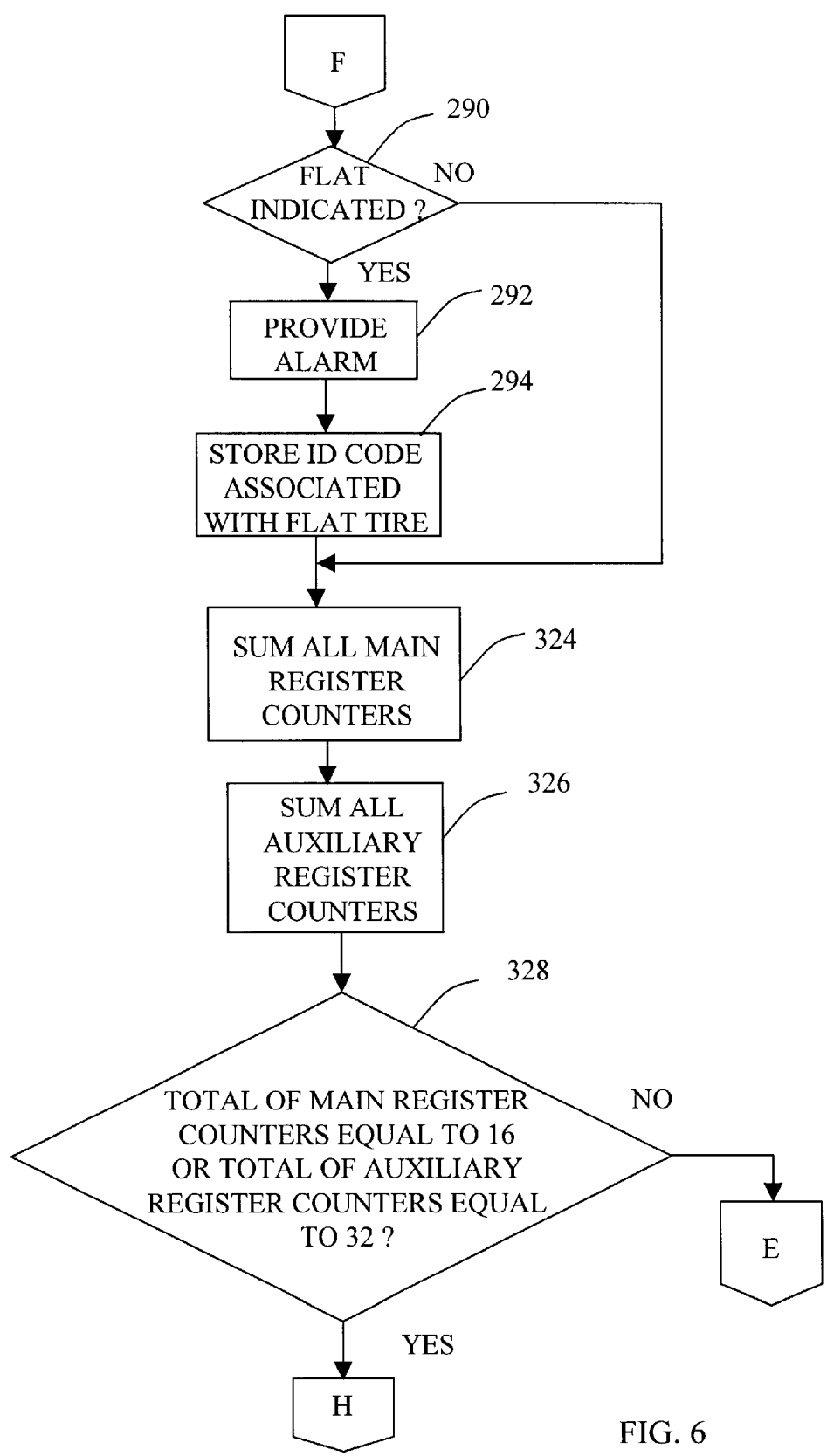

Moving to FIG. 5, processor 102 sets the variable 'MAINDETECT' to false, in step 274. Next, in step 276, processor 102 sets the variable 'n' equal to 1. Then, in decision step 278, processor 102 determines whether the received ID code is equal to the ID code stored in the first main register of the main array (i.e., mainID(1)). If so, control transfers from step 278 to step 280 where the counter associated with the first main register (mainctrID(1)) is incremented. Next, in step 282, processor 102 sets the variable 'MAINDETECT' to true to indicate that the received ID code is already stored within one of the main registers. Then, in decision step 284, processor 102 determines whether the variable 'MAINDE- TECT' is true. If so, control transfers from step 284 to step 290 (FIG. 6). Otherwise, control transfers to step 300 (FIG. 7).

In step 278, when the received ID code does not equal the ID code stored in the first main register of the main array, control transfers to step 286. In step 286, processor 102 causes the variable 'n' to be incremented by one. Next, in decision step 288, processor 102 determines whether the variable 'n' is greater than four (corresponds to four main registers). If so, control transfers from step 288 to step 284. Otherwise, control transfers from step 288 to step 278. The control loop defined by steps 278, 286 and 288 is repeated until the ID code of the received message is equal to the ID code stored in one of the main registers or until the variable 'n' is greater than four. While only four main registers are discussed herein, one of ordinary skill in the art will appreciate that more than four main registers can be utilized for vehicles that include more than four main tires (e.g., a semi-tractor and a pick-up truck with dual rear tires).

Figure 8:
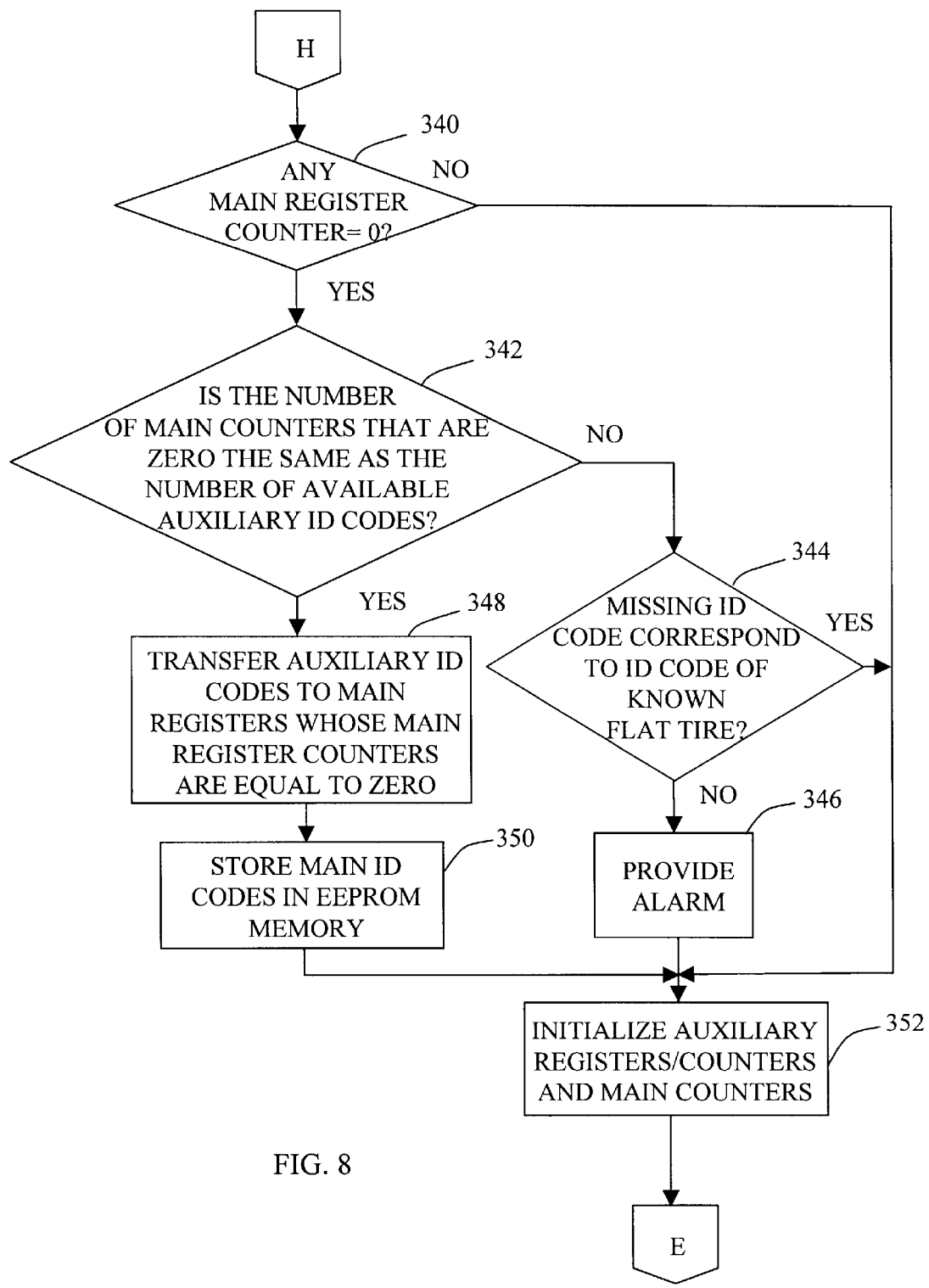

As shown in FIG. 6, in step 290, processor 102 determines whether the received message indicates that an associated tire has a low pressure. If a flat is not indicated, control transfers from step 290 to step 324. When a flat is indicated in decision step 290, control transfers to step 292 where an alarm is provided. Next, in step 294, processor 102 causes the ID code associated with the flat tire to be stored within memory (preferably, non-volatile memory). Next, in step 324, processor 102 sums all of the main ID code counters. Alternatively, a main event counter can be implemented to track the total number of times any received ID code is stored or already stored within one of the main registers. Then, in step 326, processor 102 causes all of the auxiliary register ID code counters to be summed. Alternatively, an auxiliary event counter can be implemented to track the total number of times any received ID code is stored or already stored within one of the auxiliary registers. Next, in decision step 328, processor 102 compares the total of the main register ID code counters to sixteen and the total of the auxiliary register ID code counters to thirty-two. If the total of the main register ID code counters is equal to sixteen or the total of the auxiliary register ID code counters is equal to thirty-two, control transfers to step 340 (FIG. 8). Otherwise, control transfers to step 210 (FIG. 2).

Figure 7:
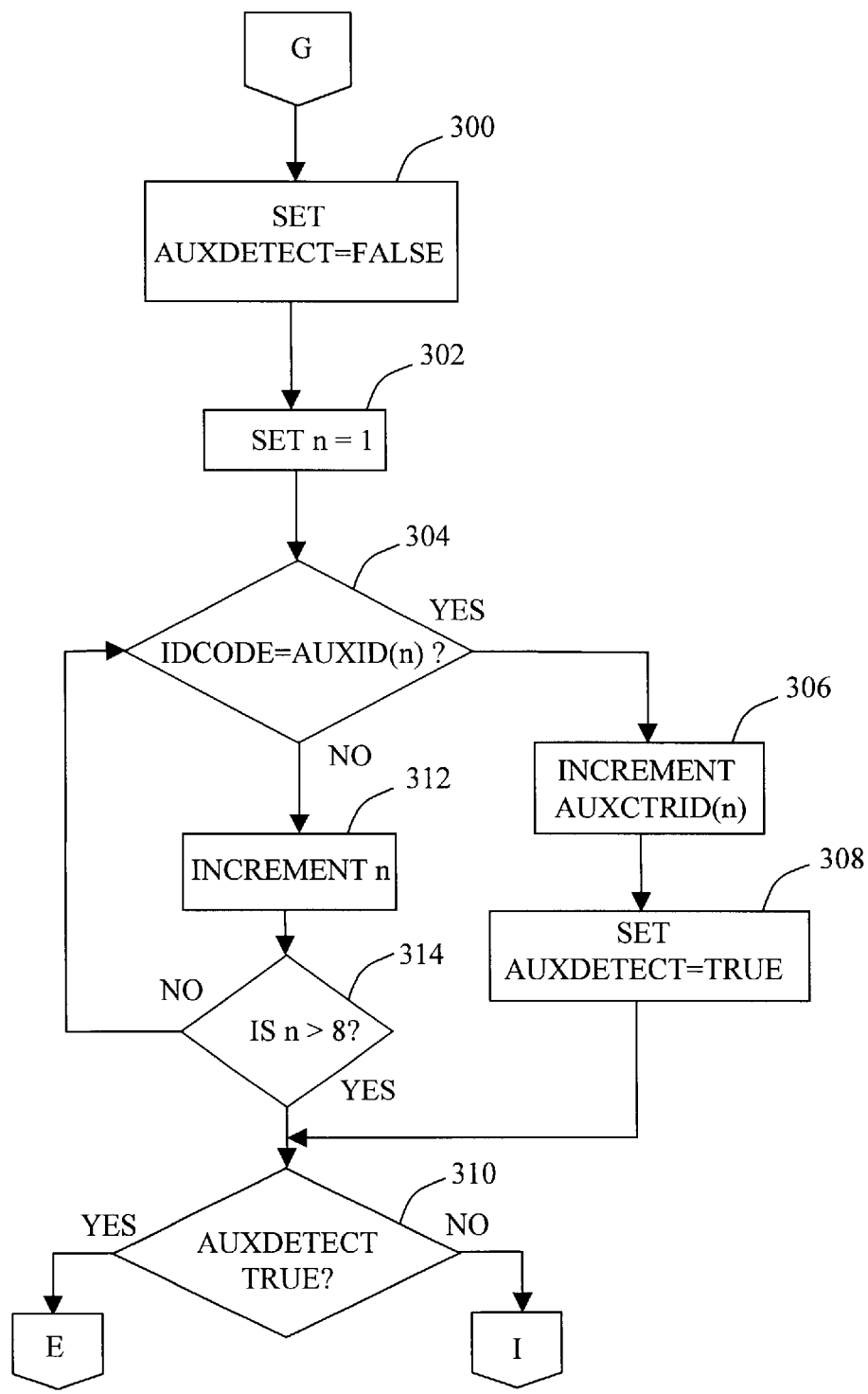

When the received ID code does not correspond to one of the ID codes already stored within one of the main registers, control transfers from step 284 (FIG. 5) to step 300 (FIG. 7). As shown in FIG. 7, in step 300, processor 102 sets the variable 'AUXDETECT' to false. Then, in step 302, processor 102 sets the variable 'n' equal to one. Next, in decision step 304, processor 102 determines whether the ID code of the received message is stored in a first auxiliary register of the auxiliary array (auxID(1)). If so, control transfers from step 304 to step 306 where processor 102 increments an ID code counter associated with the auxiliary register (auxctrID(n)) to track the number of times that the ID code has been received. Next, in step 308, processor 102 sets the 'AUXDETECT' variable to true to indicate that the received ID code corresponds to an ID code stored in one of the auxiliary registers. In step 304, when the received ID code is not equal to the ID code stored in the first auxiliary register, control transfers to step 312, where processor 102 increments the 'n' variable. Next, in step 314, processor 102 compares the value of 'n' to determine whether the variable 'n' has exceeded a desired value (in this case, eight). If so, control transfers from step 314 to step 310. Otherwise, control transfers from step 314 to step 304. The control loop defined by steps 304, 312 and 314 is repeated until the received ID code is equal to one of the ID codes stored in one of the auxiliary registers or the variable 'n' exceeds the desired value. In step 310, whenever processor 102 determines that the variable 'AUXDETECT' is true, control transfers to step 210 (FIG. 2). Otherwise, control transfers from step 310 to step 316 (FIG. 9).

Figure 9:
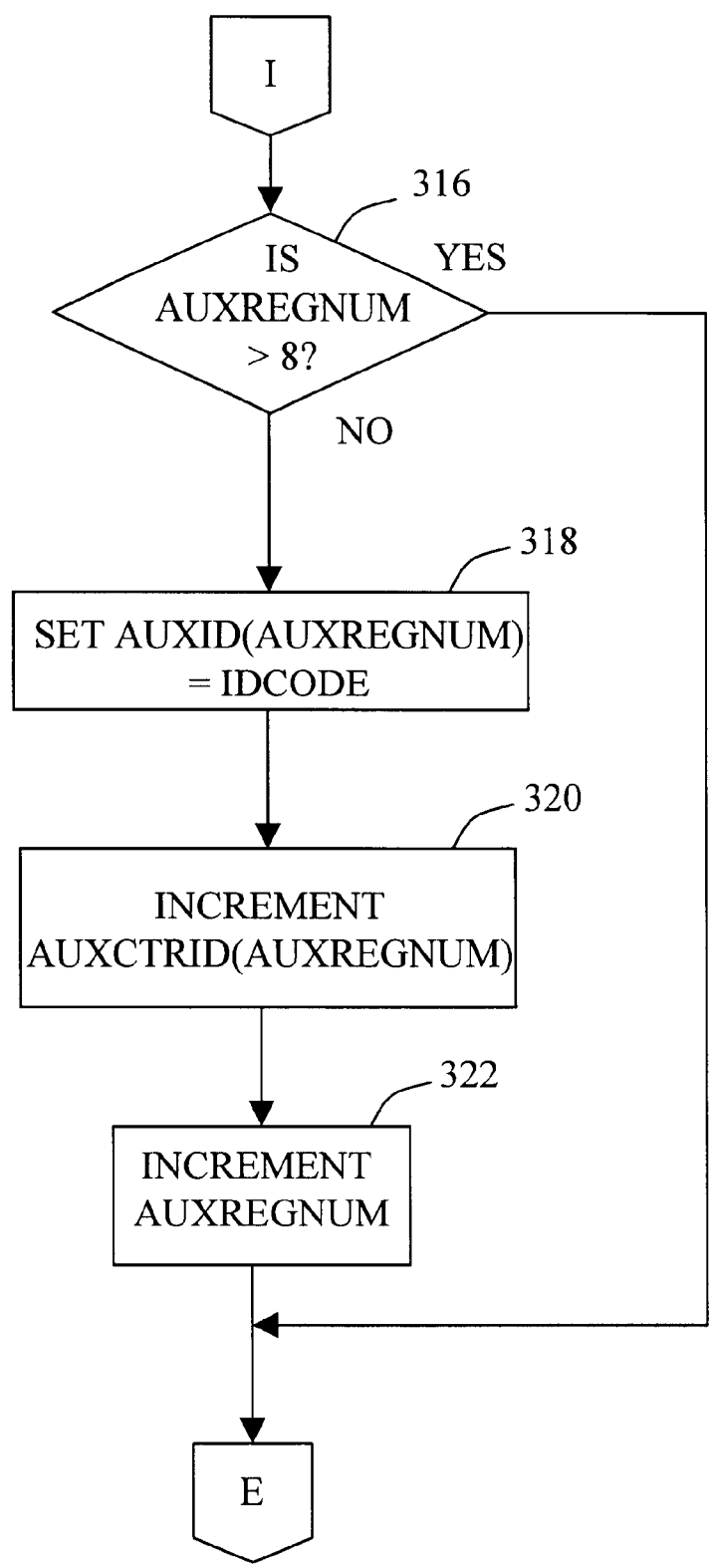

Moving to FIG. 9, processor 102 determines whether the value of 'AUXREGNUM' is greater than eight, in decision step 316. If so, control transfers from step 316 to step 210. If the auxiliary registers are not full in step 316, control transfers to step 318. In step 318, processor 102 stores the received ID code within the auxiliary register corresponding to the variable 'AUXREGNUM'. Next, in step 320, processor 102 increments the auxiliary ID code counter associated with the auxiliary register. Next, in step 322, processor 102 increments the variable 'AUXREGNUM' such that the auxiliary register currently available can be tracked. Then, control transfers to step 210 (FIG. 2).

As shown in FIG. 6, in step 328, when the total of the main register ID code counters is equal to thirty-two or the total of the auxiliary register ID code counters is equal to sixteen, control transfers to step 340 (FIG. 8). Moving to FIG. 8, processor 102 determines whether any main ID code counter is equal to zero, in decision step 340. If any main ID code counter is equal to zero, either an associated transmitter is no longer functioning or the tire containing the associated transmitter has been removed from the vehicle. Alternatively, a threshold other than zero can be implemented. If none of the main ID code counters are equal to zero, control transfers from step 340 to step 352 where processor 102 initializes the auxiliary registers/ID code counters and the main ID code counters. If one or more of the main ID code counters are equal to zero, control transfers from step 340 to decision step 342. In step 342, processor 102 determines whether the number of the main ID code counters that are equal to zero are the same as the number of available auxiliary ID codes. If so, control transfers from step 342 to step 348 where processor 102 transfers the auxiliary ID codes to the main registers whose main ID code counters are equal to zero (or below a set threshold). Next, in step 350, processor 102 causes the main ID codes to be stored in the EEPROM. From step 350, control transfers to step 352. From step 352, control transfers to step 210 (FIG. 2) where processor 102 waits for another message to be received. In step 342, if the number of available auxiliary ID codes is not equal to the number of main ID code counters that are zero (or below a threshold), control transfers from step 342 to decision step 344. In step 344, processor 102 determines if a missing ID code corresponds to an ID code of a known flat tire. If so, control transfers from step 344 to step 352. Otherwise, control transfers from step 344 to step 346 where processor 102 causes an alarm (audible and/or visual) to be provided. From step 346, control transfers to step 352.

Thus, a routine has been described which facilitates quicker loading of ID codes into the EEPROM (i.e., quicker initialization of the system), allows variable length messages to be processed by the system and is capable of masking an alarm for a known flat tire when the flat tire is replaced with a spare tire that does not include a transmitter, among others. In this manner, a TM system, according to the present invention, can determine at a later time if a flat tire associated with the ID code has been replaced with a spare tire that does not include a transmitter.

Figure 10A:
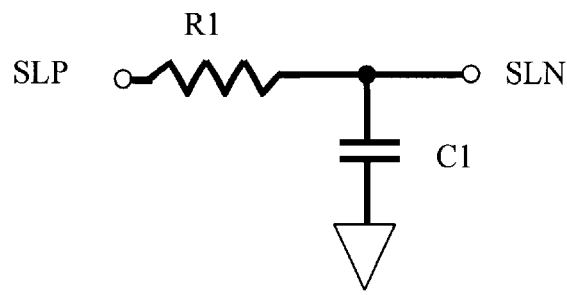
FIG. 10A is an electrical schematic of an averaging signal filter that has been utilized in conjunction with a data slicer.

FIG. 10A is an electrical schematic of an averaging signal filter (i.e., a low pass filter) that has been utilized with a data slicer (i.e., a comparator) to enhance the ability of a receiver to resolve data bits of a received message. In this configuration, a first end of resistor RI is coupled to a positive input of the data slicer (SLP). A second end of resistor RI is coupled to a first end of capacitor C1. A second end of capacitor C1 is coupled to a common ground. The second end of resistor R1 and the first end of capacitor C1 are coupled to the negative input of the data slicer (SLN). Such an averaging signal filter is typically not optimal in automotive environments, which may include high levels of impulse noise and data signals that rapidly fade. This is because the data slicer threshold, set by the averaging signal filter, is typically too low when high levels of impulse noise are present and typically cannot readily track variations in the input signal.

Figure 10B:
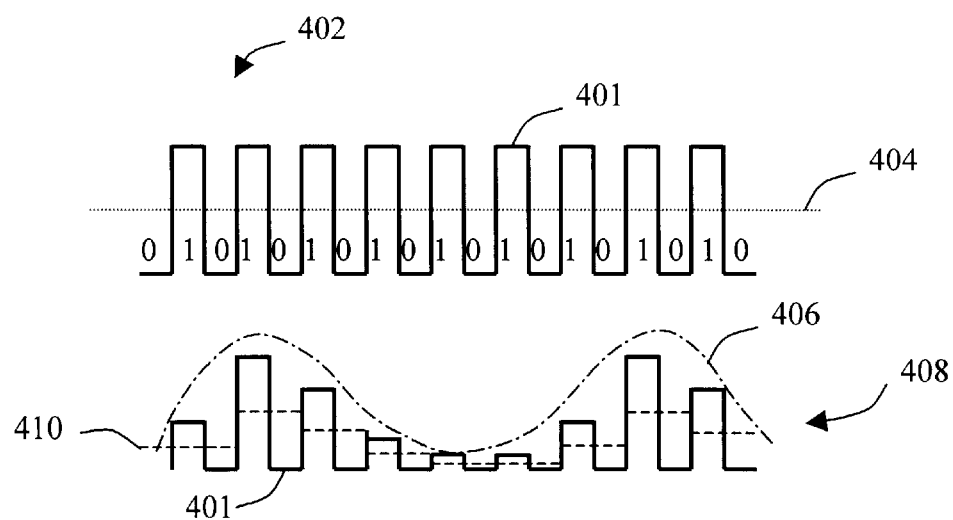
FIG. 10B is an exemplary waveform diagram that shows how the magnitude and threshold of a signal, associated with a tire monitoring transmitter, can vary due to wheel rotation.

FIG. 10B shows an exemplary pulse train 402, that includes a plurality of pulses 401 with a non-variable threshold 404, as would typically be provided by a transmitter located within a tire. The duty cycle of each positive pulse 401 of the exemplary pulse train 402 (i.e., the transmitted signal), as shown for illustration purposes, is one-hundred percent. However, a receiver located within a vehicle would receive an attenuated signal that varies according to tire rotation. That is, as the tire rotates the transmitted signal is attenuated by the wheel, typically in a sinusoidal fashion 406, to provide a pulse train 408 that has a varying threshold 410. As discussed above, when an averaging signal filter is utilized to set a data slicer threshold, in the receiver, the threshold typically will not adequately track variations in the input signal and will normally be set too low when high levels of impulse noise are present. This is especially true for systems that implement a pulse width modulation (PWM) coding scheme with varying duty cycles (e.g., thirty-three percent 'on' for a logic zero, and sixty-six percent 'on' for a logic one).

Figure 10C:
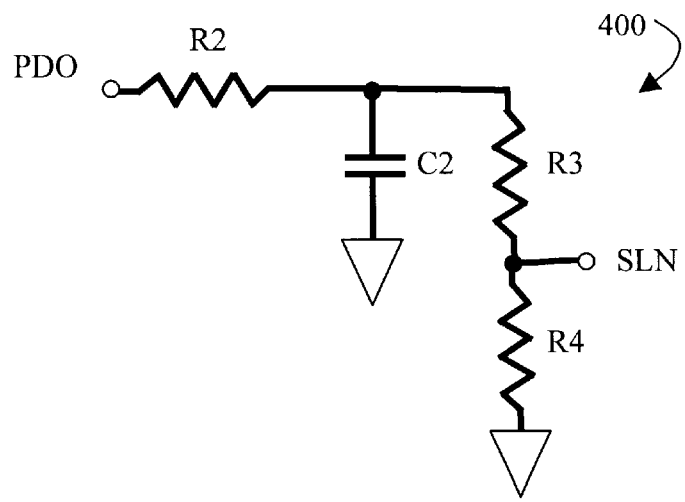
FIG. 10C is an electrical schematic of a filter network that is utilized in conjunction with a peak detector to set a data slicer threshold, according to an embodiment of the present invention.

FIG. 10C depicts a filter network (i.e., a peak detector signal filter) 400, according to an embodiment of the present invention, that uses a peak detector to set a data slicer threshold. While the TM system 100, described herein, utilizes a pulse width modulation (PWM) transmission scheme, it is contemplated that the filter network 400 can be beneficially implemented with Manchester or other DC free coded systems. The filter network 400 is utilized in combination with a peak detector to set a data slicer threshold, which allows the data slicer to reject more impulse noise. Further, the filter network 400 allows a data slicer threshold to track a transmitted message as it fades, for example, due to wheel rotation.

The filter network 400 has a charge time constant (i.e., attack constant), set by resistor R2 and capacitor C2, which when set to an appropriate value, prevents impulse noise from having an undesirable effect on the data slicer threshold. The discharge time constant (i.e., release time constant) is defined by capacitor C2 and resistors R3 and R4, which are set to allow the threshold to follow the transmitted message during rapid fading caused by, for example, wheel rotation. The present invention, when implemented in a tire monitoring (TM) system, provides a receiver with an improved signal-to-noise ratio, which results in a more reliable (TM) system. In a preferred embodiment, the filter circuit of FIG. 10C is utilized in conjunction with an Infineon receiver (Part No. TDA5201).

Suitable values for the components of the filter circuit of FIG. 10C, as implemented, are as follows: resistor R2, 1 kΩ; capacitor C2, 0.047 μF; resistor R3, 10 kΩ; and resistor R4, 82 kΩ. As shown, a first end of resistor R2 is coupled to a peak detector output (PDO) that provides a peak of a received demodulated message. A second end of resistor R2 is coupled to a first end of capacitor C2 and a first end of resistor R3. A second end of capacitor C2 is coupled to a common ground. A second end of resistor R3 is coupled to a first end of resistor R4 and a second end of resistor R4 is coupled to a common ground. The second end of resistor R3 and the first end of resistor R4 are coupled to a negative input of the data slicer (SLN). As previously mentioned, the use of resistor R2 provides an attack time constant that prevents impulse noise from adversely raising the data slicer threshold.

According to another embodiment of the present invention, a learned tire table (LTT), a candidate tire table (CTT), a learned cycle count (LCC), candidate cycle count (CCC), and a message count (MC) are used to generate a report cycle (RC). This algorithmically derived RC is used as the fundamental unit of time for learning/removing tires from the LTT.

The same type of data is stored in the LTT and the CTT, although for different tires. The LTT contains entries for tires already associated with the vehicle, whereas, the CTT contains entries for tires that potentially should be associated with the vehicle. Preferably, each of the LTT and CTT tables include four rows, such that each table accommodates a maximum of four tires. However, it should be appreciated that virtually any number of rows can be accommodated as the routine can automatically adapt through calculation of the LCC or CCC. The information stored in each of the four rows preferably consists of a counter, an associated tire ID, a last reported tire pressure, and may include various additional flags such as tire location on the vehicle, etc. An entire row is assumed to be empty if the count is zero.

At power-on, the CTT is zeroed and the LTT is initialized from the last LTT values saved in non-volatile memory (e.g., EEPROM), if any. If all of the fields of a saved LTT row are filled with OXFF, as may be the case after initial manufacture, the entire row is assumed to be empty and is therefor zeroed. If the count for an LTT row is non-zero, i.e., the row is not empty, the count is initialized to a learned initial count (LIC), e.g., sixteen. Once the LTT has been initialized, an initial value for the learned cycle threshold (LCT) is calculated from the LTT, by multiplying the number of non-empty entries (rows) in the LTT by a learned counts per slot (LCPS) with a value of, for example, sixteen. An initial value for the candidate cycle threshold (CCT) is similarly calculated from the CTT, by multiplying the number of non-empty entries (rows) in the CTT by a candidate counts per slot (CCPS) with a value of, for example, thirty-two. Both the LCT and the CCT are recalculated whenever an entry is, respectively, added/removed to/from the LTT or CTT. The MC is a counter that is incremented whenever a successful message is received, regardless of the corresponding tire ID. At power-on, the MC is set to zero.

The LTT, LCT, CTT, CCT, and MC are generally used to define the RC as follows. Whenever a successful message has been received, a search is made through the LTT. If the corresponding tire ID is found in the LTT, the corresponding counter is incremented up to a maximum value (e.g., 255). If the tire ID is not found in the LTT, the CTT is searched. If the tire ID is found in the CTT, the corresponding counter is similarly incremented. Note, a tire ID cannot appear in both the LTT and CTT. After any found corresponding counter has been incremented, the MC is incremented. The end of a RC is deemed to have happened if either of the following three conditions are satisfied: the total of all non-zero counts in the LTT meet or exceed the LCT; the total of all non-zero counts in the CTT meet or exceed the CCT; or, the MC meets or exceeds MAXMC (currently 256).

These three conditions generally guarantee that during normal operation of the system adequate RCs are generated. At initialization, before any tires have been learned, the CCT comparison is primarily responsible for determining RCs. After all of the tires have been learned, the LCT comparison is primarily responsible for determining RCs. In the event all four learned tires have been replaced by different tires with different IDs, the MC and CCT comparisons will be primarily responsible for guaranteeing the RCs are generated. It should be appreciated that if all of the vehicle tires are replaced with tires that do not include transmitters/sensors or the receiver fails, it may be beneficial to use an external reference, such as an ignition cycle, entering reverse, time, speed, a change in location as indicated by a global positioning system (GPS), a change in compass direction, a day/night detect, a vibration sensor and/or a microphone to provide an external event, which can be used to determine that the TM system is inoperable.

The learning routine is executed when the end of a RC has been detected. The learning routine is primarily directed to determining when to promote tires from the CTT to the LTT and how to remove tires from the LTT. If a candidate tire count meets or exceeds a predetermined threshold, and an LTT entry is empty, the CTT entry is moved to the LTT, the corresponding LTT and CTT values are recalculated and the LTT is saved to non-volatile memory (EEPROM). After any newly learned tires have been promoted, all counters in both the LTT and CTT are adjusted. Preferably, the report count values for each row of each table are divided by two, however, other fractions may be used, such as multiplication by $7/8$, etc. In any case, the effect of this integer mode multiplication and/or division is to reduce the count associated with each tire in each table. In this way, tires which are no longer present will eventually be removed from the table, as their counters will eventually go to zero if their associated transmitters fail to report for a number of RCs. The number of RCs before this happens is determined by this fraction and the minimum value set when a message was last seen (LIC, in the example cited above). In this manner, the report count for a tire decays with a geometric progression. As long as a tire reports again before its count decays to zero, it is remembered.

The RC is defined by the actual reports generated by the tire transmitters and, therefore, does not correspond to an actual predetermined time interval. That is, the RC is a function of the report frequencies of the transmitters installed in the tires of the vehicle. When the vehicle is stopped, or moving slowly, the RC represents a longer period of time than when it is moving fast. By calculating the LCT and CCT based on the number of rows in the LTT and CTT, respectively, the length of a RC should be roughly equal irrespective of the number of tires in either table.

Preferably, the tire IDs are learned as quickly as possible in a factory setting. However, a factory setting is initially the most likely to present the largest number of conflicting transmitters. Consequently, the tire IDs are preferably initially learned while the vehicle is moving (e.g., at 20 mph) and it is therefore assumed that two vehicles are not moving along side one another for an appreciable amount of time during the initial learn period. When initially manufactured, a number of alternate learn methods may be employed to accelerate the initial learn process. Among these possibilities are reducing the initial LCT and CCT values for the initial learn, direct transmission to the receiver and manual learn mode, in which case the tires may be learned in a pre-determined order.

In any case, once the tires have been learned in such a fashion that their positions on the vehicle are known, i.e., left-front, right-front, right-rear, and/or left rear, it is desirable that these positions be maintained. It may be seen that if only one tire is removed from the vehicle, as in the case when a flat tire is changed, a newly learned tire must be in the same location as the originally removed tire. Flags are maintained in the LTT associated with each tire that determine whether each tire's location is known. When a new tire is added, if the location of all of the other tires is known, the newly learned tire is assumed to be that of the only known missing location. This may not be satisfactory if the tires are all rotated, in which case, it is assumed that the service personnel will utilize one of the other learning methods which provide full tire location information.

By initializing the LTT from non-volatile memory and through proper application of the above-described routine, tires which have been learned in the past are favored over any new tires whose IDs may be received. However, it should be appreciated that even favored tires should eventually be removed if they are no longer associated with the vehicle. Such is the case when flats are changed.

Because the routine preferably continuously monitors the transmissions of the transmitters associated with the tires of the vehicle, the pressure of a given tire is typically reported multiple times, e.g., transmitted eight times, as it is expected that the receiver will not receive all transmissions due to tire rotation and other issues associated with the tire transmitters and the receiver. Since the transmitters are battery powered, the transmitters generally always report, whether or not the vehicle is operational, although the routine does not execute when the vehicle is off. When the vehicle is on, the routine initializes the LTT and CTT, as described above. An initial LCT is calculated based upon the freshly initialized LTT and the MC is set to zero. The routine then enters a loop where it processes each message. Whenever a message is successfully received (meaning it passes all appropriate error checks, etc.), the MC is incremented (up to a maximum value). The LTT and CTT are then updated based upon the successfully received message. If an entry corresponding to the ID of the received message is found in either the LTT or CTT, its counter is incremented (up to a maximum value). If this value is less than LIC, e.g., sixteen, it is forced to the value for the LIC. If the ID of the message is not found in the LTT or CTT and there is an empty row in the CTT, this entry is added to the CTT. The routine then checks to determine if the current RC has expired. If the RC has not expired, the routine proceeds to process the next message. When the RC expires, the LTT and CTT are examined to determine whether new tires should be learned or old tires forgotten.

The routine determines that a RC is complete by comparing the sum of the pressure report counts in the LTT to the LCT. If this LTT total meets or exceeds the LCT, then the end of a RC has been found. If this LTT total is less than LCT, the routine then compares the total number of pressure report counts in the CTT to a candidate count threshold (CCT). If this CTT total meets or exceeds the CCT, then the end of a RC is indicated. If this CTT total is less than the CCT, then the routine compares the MC to a maximum MC (MAXMC), e.g., two-hundred fifty-six. If the MC meets or exceeds the MAXMC, then the end of a RC is indicated, otherwise, execution proceeds to process the next message as detailed above.

At the end of a RC, the LTT is examined. Any empty row in the LTT (as determined by a zero count) is replaced with a suitable row from the CTT (as determined by the number of reports in the CTT row exceeding a pre-determined threshold). If an entry from the CTT is promoted to the LTT, the original CTT entry is then zeroed, to make room for any future CTT entry. The updated LTT is then saved to the EEPROM. By saving the LTT, the currently learned tires may be restored when the vehicle is powered-on in the future.

After the LTT, CTT and LTT copy in the EEPROM have been updated, the counts associated with the LTT and CTT are adjusted. In one embodiment, the counts are updated at the end of every RC. Preferably, the report count values for each row of each table are divided by two, however, other fractions may be used, such as multiplication by ⅞, etc. In any case, the effect of this integer mode multiplication and/or division is to reduce the count associated with each tire in each table. In this way, tires which are no longer present will be eventually removed from the table, as their counters will eventually go to zero. The number of RCs before this happens is determined by this fraction and the minimum value set when a message was last seen (LIC, in the example cited above). In this manner, the report count for a tire decays with a geometric progression. As long as a tire reports again before its count decays to zero, it will be remembered. Preferably, after the counts have been updated, the LCT is recalculated, as described above, since the number of valid rows in the LTT may have changed.

The reason that three criteria are used to determine the end of a RC is to insure that the LTT eventually empties, if, for example, all of the tires are changed. If the LTT is full and all of the tires are changed, either the counts in the CTT or the MC eventually trigger the end of a RC (assuming the receiver and transmitters are working correctly), which eventually caused the LTT to be emptied when the vehicle is powered on for a suitably long period of time. If both the LTT and CTT are filled with stale data, the MC insures that the RC continues to execute, although with a potentially longer period and reduced frequency. By reducing the counts geometrically, rather than zeroing them at an end of a RC, stray tires are prevented from contaminating the LTT. Although stray tires may fill the CTT, the LTT integrity is preserved, as long as the transmitters of the vehicle continue to report at a sufficiently frequent interval. Basing the LCT upon the number of entries in the LTT generally maintains a constant RC when the tires are rotating quickly, independent of the number of tires which have been learned.

Correct operation of the routine is based on the selection of appropriate values for LCPS, LIC, CCT, MAXMC and the fraction used to update the LTT and CTT. These numbers should be based on the maximum relative frequencies of the slow and quick report modes, so that learned tires are remembered even when confronted by foreign tire reports. Care must also be taken to insure that an excessive message count from a foreign tire does not cause premature emptying of the LTT and CTT.

Thus, the routine described above deletes a tire entry from a table after a number of intervals instead of at the end of, for example, one interval. It should be appreciated that in order for the routine described above not to unlearn a spare tire, which is not transmitting with the same frequency as a tire on a vehicle, is necessary to use values such that a spare tire count is not allowed to go to a zero count during a single RC. For example, if a RC occurs approximately every one minute and a spare tire reports once an hour, the spare tire should not be removed from the LTT unless it fails to report for at least sixty RCs.

According to another embodiment of the present invention, a circular buffer is implemented within the memory subsystem such that when the TM system senses that a tire pressure is low, a warning is logged within the circular buffer. This feature is primarily implemented to address failure of the TM system to warn of an impending flat tire. In TM systems that provide both ID, location and pressure of a given tire, the logged warnings may include a given tire ID, tire location and tire pressure. In systems that do not have the capability to provide tire ID, tire location and tire pressure, the total number of warnings may be logged. For example, the system may log the number of warnings during an external event (e.g., an ignition cycle). It will be appreciated that the size of the circular buffer can be as large or as small as desired and may, for example, log ten warnings and related information. Alternatively, the external event may be, for example, based on the vehicle going into and/or out of reverse, a vehicle speed (e.g., calculated through various GPS locations or as indicated by a vehicle sensor), a compass change or a day/night detect. An advantage of using speed to initiate the cycle is that it allows for the determination of whether a given transmitter is bad based upon a speed threshold.

Accordingly, an improved tire monitoring (TM) system has been described that includes a peak detector signal filter that is configured to substantially prevent impulse noise from increasing a data slicer threshold, while simultaneously allowing the data slicer threshold to follow the variations in a received message attributable to signal fading due to wheel rotation. The TM system also automatically determines the location of a plurality of vehicle tires relative to the vehicle, utilizes a single receiver to receive messages of multiple lengths and masks an alarm when a missing ID code corresponds to a stored ID code associated with a flat tire.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method for improving the ability of a data slicer to properly resolve data bits of a received message in the presence of high noise levels relative to the received message, the received message also exhibiting signal fading, the data slicer including a first input, a second input and an output, the method comprising the steps of:

providing a peak detector that includes a peak detector input and a peak detector output, wherein the peak detector input is coupled to the first input of the data slicer, and wherein the peak detector output provides a peak detector signal that corresponds to a peak of a received demodulated signal; and providing a peak detector signal filter coupled between the peak detector output and the second input of the data slicer, wherein the peak detector signal filter is configured to substantially prevent impulse noise from increasing a variable data slicer threshold on the second input of the data slicer while simultaneously allowing the data slicer threshold to substantially follow the variations in the demodulated signal attributable to signal fading.

2. The method of claim 1, wherein the demodulated signal is in the form of a pulse width modulated (PWM) code.

3. The method of claim 2, wherein if a duty cycle of a bit of the demodulated signal is about thirty-three percent, a digital zero is indicated, and if the duty cycle is about sixty-six percent, a digital one is indicated.

4. The method of claim 1, wherein the received signal originates from a transmitter in a tire and the signal fading is due to wheel rotation.

5. A signal processing system for improving the ability of a data slicer that is coupled to a tire pressure receiver to properly resolve data bits of a received message in the presence of high noise levels relative to the received message, the received message also exhibiting signal fading, the data slicer including a first input, a second input and an output, the system comprising:
- a peak detector that includes a peak detector input and a peak detector output, wherein the peak detector input is coupled to the first input of the data slicer, and wherein the peak detector output provides a peak detector signal that corresponds to a peak of a received demodulated signal; and
- a peak detector signal filter coupled between the peak detector output and the second input of the data slicer, wherein the peak detector signal filter is configured to substantially prevent impulse noise from increasing a variable data slicer threshold on the second input of the data slicer while simultaneously allowing the data slicer threshold to substantially follow the variations in the demodulated signal attributable to signal fading.

6. The system of claim 5, wherein the demodulated signal is in the form of a pulse width modulated (PWM) code.

7. The system of claim 6, wherein if a duty cycle of a bit of the demodulated signal is about thirty-three percent, a digital zero is indicated, and if the duty cycle is about sixty-six percent, a digital one is indicated.

8. The system of claim 5, wherein the received signal originates from a transmitter in a tire and the signal fading is due to wheel rotation.

9. A method for automatically determining the location of a plurality of vehicle tires relative to a vehicle, comprising the steps of:
- providing a plurality of sensors each located in a different one of the plurality of vehicle tires, and wherein each of the sensors provides an indicator of a rotation direction in a main rotation plane for the vehicle tire in which it is located; and
- providing a plurality of transmitters each associated with a respective one of the sensors, wherein each of the transmitters is configured to transmit a unique transmitter identification code and the indicator of the rotation direction for the vehicle tire in which it is located to a receiver located in the vehicle, and wherein each of the sensors further provide another indicator of whether one of the plurality of vehicle tires has turned out of the main rotation plane.

10. The method of claim 9, wherein each of the sensors includes a two axis accelerometer that has a first axis aligned along the main rotation plane and a second axis aligned perpendicular to the main rotation plane.

11. The method of claim 9, wherein the sensor includes a single throw switch aligned along the main rotation plane, and wherein a switch closure represents a first direction of rotation and no switch closure represents a second direction of rotation that is opposite the first direction of rotation.

12. The method of claim 9, wherein the sensor includes a gyroscope aligned to determine the direction of rotation and any deviation from the main rotation plane.

13. A tire monitoring system including the capability of automatically determining the location of a plurality of vehicle tires relative to a vehicle, the system comprising:
- a plurality of sensors each located in a different one of the plurality of vehicle tires, and wherein each of the sensors provides an indicator of a rotation direction in a main rotation plane for the vehicle tire in which it is located; and
- a plurality of transmitters each associated with a respective one of the sensors, wherein each of the transmitters is configured to transmit a unique transmitter identification code and the indicator of the rotation direction in the main rotation plane for the vehicle tire in which it is located to a receiver located in the vehicle, and wherein each of the sensors further provides another indicator of whether one of the plurality of vehicle tires has turned out of the main rotation plane.

14. The system of claim 13, wherein the sensor includes a two axis accelerometer that has a first axis aligned along the main rotation plane and a second axis aligned perpendicular to the main rotation plane.

15. The system of claim 13, wherein the sensor includes a single throw switch aligned along the main rotation plane, and wherein a switch closure represents a first direction of rotation and no switch closure represents a second direction of rotation that is opposite the first direction of rotation.

16. The system of claim 13, wherein the sensor includes a double throw switch aligned along the main rotation plane, wherein a switch closure in a first direction represents a first direction of rotation and a switch closure in a second direction represents a second direction of rotation that is opposite the first direction of rotation.

17. The system of claim 13, wherein the sensor includes a gyroscope aligned to determine the direction of rotation and any deviation from the main rotation plane.

18. A method for utilizing a single receiver for receiving messages of multiple lengths, comprising the steps of:
- receiving a message from a transmitter, the message including a plurality of bits, wherein a portion of the plurality of bits of a valid message correspond to a transmitter identification code;
- providing a timeout indication when a bit is not detected in the received message for a timeout period;
- providing a first indication when the number of bits in the received message is equal to a first number of total bits;
- providing a second indication when the number of bits in the received message is equal to a second number of total bits that is greater than the first number of total bits; and
- processing the message according to the first and second indications, wherein the first and second indications allow different length messages to be distinguished such that the single receiver can receive transmissions from transmitters that have different length messages.

19. The method of claim 18, further including the step of:
- clearing the timeout, first and second indications when the length of the message exceeds a maximum frame length or the timeout indication is provided other than following receipt of the first and the second number of total bits.

20. A tire monitoring system for monitoring a plurality of vehicle tires associated with a vehicle, the system comprising:
- a plurality of transmitters for transmitting messages, wherein one of the transmitters is located in each of the plurality of vehicle tires;
- a processor;
- a receiver coupled to the processor and in communication with the transmitters;
- a memory subsystem coupled to the processor, the memory subsystem storing information and processor executable code for causing the processor to perform the steps of:

receiving transmitted messages, wherein each of the messages including a plurality of bits, and wherein a portion of the plurality of bits of a valid message correspond to a transmitter identification code;

providing a timeout indication when a bit is not detected in the received message for a timeout period;

providing a first indication when the number of bits in the received message is equal to a first number of total bits;

providing a second indication when the number of bits in the received message is equal to a second number of total bits that is greater than the first number of total bits;

processing the message according to the first and second indications, wherein the first and second indications allow different length messages to be distinguished such that the receiver can receive transmissions from transmitters that have different length messages;

storing a flat tire transmitter identification code;

determining whether a missing transmitter identification code corresponds to the stored flat tire transmitter identification code; and masking an alarm when the missing transmitter identification code corresponds to the stored flat tire transmitter identification code;

a data slicer coupled to the receiver, the data slicer including a first input, a second input and an output;

a peak detector coupled to the first input of the data slicer, the peak detector providing a peak detector signal that corresponds to a peak of the message;

a peak detector signal filter coupled between the peak detector output and the second input of the data slicer, wherein the peak detector signal filter is configured to substantially prevent impulse noise from increasing a variable data slicer threshold on the second input of the data slicer while simultaneously allowing the data slicer threshold to substantially follow the variations in the demodulated signal attributable to signal fading; and a plurality of sensors, wherein one of the sensors is located in each of the vehicle tires, and wherein each of the sensors provides an indicator of a rotation direction in a main rotation plane for the vehicle tire in which it is located, where the processor utilizes the indicator provided by each of the sensors to automatically determine the location of each of the vehicle tires relative to the vehicle.

21. A method for masking an alarm provided by a tire monitoring system when a transmitter equipped flat tire is replaced with a spare tire that does not include a transmitter, comprising the steps of:

storing a transmitter identification code associated with a flat tire;

determining whether a missing transmitter identification code corresponds to the stored transmitter identification code associated with the flat tire; and masking an alarm when the missing transmitter identification code corresponds to the stored transmitter identification code associated with the flat tire.

22. A tire monitoring system for monitoring a plurality of vehicle tires associated with a vehicle, the system comprising:

a plurality of transmitters for transmitting messages, wherein one of the transmitters is located in each of the plurality of vehicle tires;

a processor;

a receiver coupled to the processor and in communication with the transmitters; and a memory subsystem coupled to the processor, the memory subsystem storing information and processor executable code for causing the processor to perform the steps of:

receiving transmitted messages, wherein each of the messages including a plurality of bits, and wherein a portion of the plurality of bits of a valid message correspond to a transmitter identification code;

providing a timeout indication when a bit is not detected in the received message for a timeout period;

providing a first indication when the number of bits in the received message is equal to a first number of total bits;

providing a second indication when the number of bits in the received message is equal to a second number of total bits that is greater than the first number of total bits; and processing the message according to the first and second indications, wherein the first and second indications allow different length messages to be distinguished such that the receiver can receive transmissions from transmitters that have different length messages.

23. A tire monitoring system for monitoring a plurality of vehicle tires associated with a vehicle, the system comprising:

a plurality of transmitters for transmitting messages, wherein one of the transmitters is located in each of the plurality of vehicle tires;

a processor;

a receiver coupled to the processor and in communication with the transmitters; and a memory subsystem coupled to the processor, the memory subsystem storing information and processor executable code for causing the processor to perform the steps of:

storing a transmitter identification code associated with a flat tire;

determining whether a missing transmitter identification code corresponds to the stored transmitter identification code associated with the flat tire; and masking an alarm when the missing transmitter identification code corresponds to the stored transmitter identification code associated with the flat tire.

* * * * *

UNITED STATES PATENT AND TRADEMARK OFFICE
CERTIFICATE OF CORRECTION

PATENT NO. : 6,696,935 B2 Page 1 of 1
APPLICATION NO. : 09/949955
DATED : February 24, 2004
INVENTOR(S) : Timothy A. Bonardi et al.

It is certified that error appears in the above-identified patent and that said Letters Patent is hereby corrected as shown below:

Column 3, line 24:
"Figs. 1C-D" should be - -Figs. 1C-1D- -; and

Column 6, line 43;
Before "step" delete "20".

Signed and Sealed this

Twenty-second Day of August, 2006

JON W. DUDAS
*Director of the United States Patent and Trademark Office*